D. C. BUELL.
STEAM DISH-CLEANER.

No. 193,222. Patented July 17, 1877.

Fig.1.

Attest:
J. W. Wright.
T. J. Bush

Inventor:
Don Carlos Buell

D. C. BUELL.
STEAM DISH-CLEANER.

No. 193,222.          Patented July 17, 1877.

Fig. 2.

Attest:
J. M. Wright
T. J. Bush

Inventor:
Don Carlos Buell.

D. C. BUELL.
STEAM DISH-CLEANER.

No. 193,222.   Patented July 17, 1877.

Fig. 3.

Attest
J. M. Wright
T. J. Bush

Inventor:
Don Carlos Buell.

D. C. BUELL.
STEAM DISH-CLEANER.

No. 193,222. Patented July 17, 1877.

Attest:
I. M. Wright.
T. J. Bush.

Inventor:
Don Carlos Buell,

D. C. BUELL.
STEAM DISH-CLEANER.

No. 193,222. Patented July 17, 1877.

Attest:
F. M. Wright.
T. J. Bush

Inventor:
Don Carlos Buell,

D. C. BUELL.
STEAM DISH-CLEANER.

No. 193,222. Patented July 17, 1877.

Attest:
J. W. Wright,
T. J. Bush.

Inventor:
Don Carlos Buell.

UNITED STATES PATENT OFFICE.

DON CARLOS BUELL, OF PARADISE, KENTUCKY.

IMPROVEMENT IN STEAM DISH-CLEANERS.

Specification forming part of Letters Patent No. 193,222, dated July 17, 1877; application filed November 16, 1874.

*To all whom it may concern:*

Be it known that I, DON CARLOS BUELL, of Paradise, Muhlenburg county, Kentucky, have invented a Steam Dish-Cleaner, of which the following is a specification:

The invention is an improvement in apparatus adapted for the employment of hot water and steam for cleansing crockery, porcelain, glassware, plate, forks, spoons, and other similar wares.

The invention includes the rapid exhaustion of the steam, and, in a measure, the atmosphere, from the cleansing-chamber, to hasten the drying and cooling of the articles cleansed, as described, and also as an accessory in the use of the steam-jets, whereby the velocity with which the currents leave the jet-pipes is better preserved until they strike the surfaces to be cleansed, the forcible impact of the currents upon the surfaces being, in most cases, though not in equal degrees, an essential condition; and the invention also consists in the use of an air-blast in similar jets as an additional means of hastening the drying and cooling of the articles cleansed, the air being tempered by passing through the pipes previously heated by the steam, and the drying and cooling being thus effected gradually, but rapidly, without danger to the articles from unequal or too sudden contraction.

The invention further consists in the construction of the receptacles and holders for the articles to be cleansed, which should admit of simple and rapid manipulation, and in which the articles shall occupy as little space as possible, and yet allow the passage of strong currents of steam, hot water, or spray between them; and in certain mechanical contrivances by means of which the jets of steam, hot water, or spray may be directed upon all parts of the articles to be cleansed, the vapor be rapidly exhausted from the cleansing-chamber, and the steam, water, and other accumulations of the cleansing carried off.

Fig. 6 is a sectional elevation. The remaining figures (7 to 21, inclusive) are detail views which will be hereinafter referred to.

Figure 1:
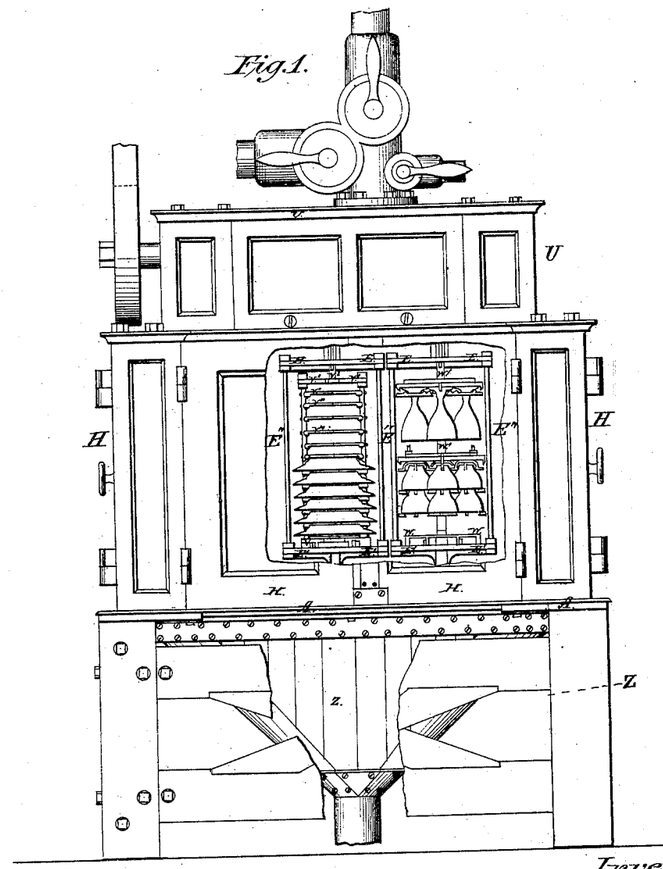
Figure 1 is a side elevation of the machine, part being broken out to show the interior construction.
Figure 2:
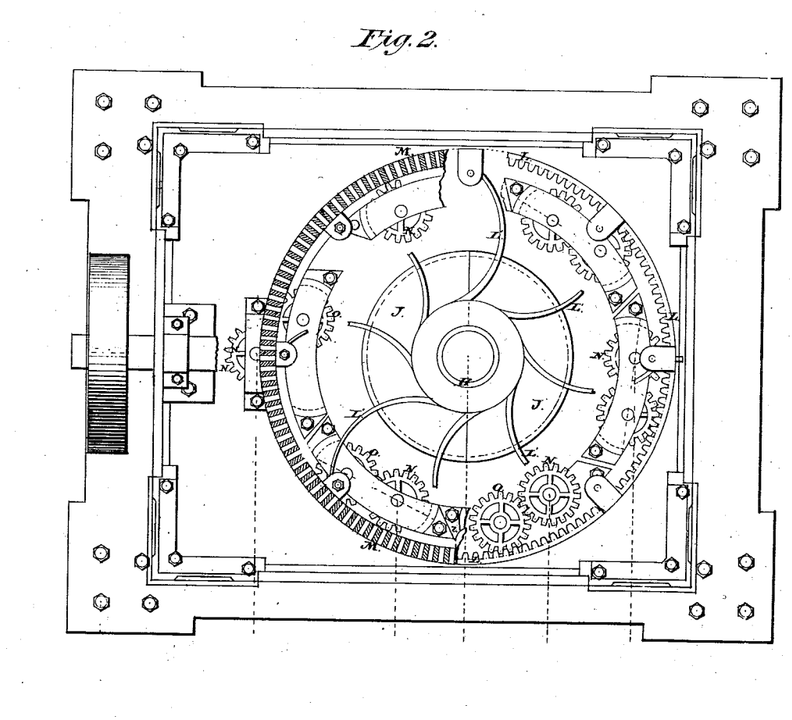
Figs. 2, 3, 4, and 5 are horizontal sections of the machine.
Figure 6:
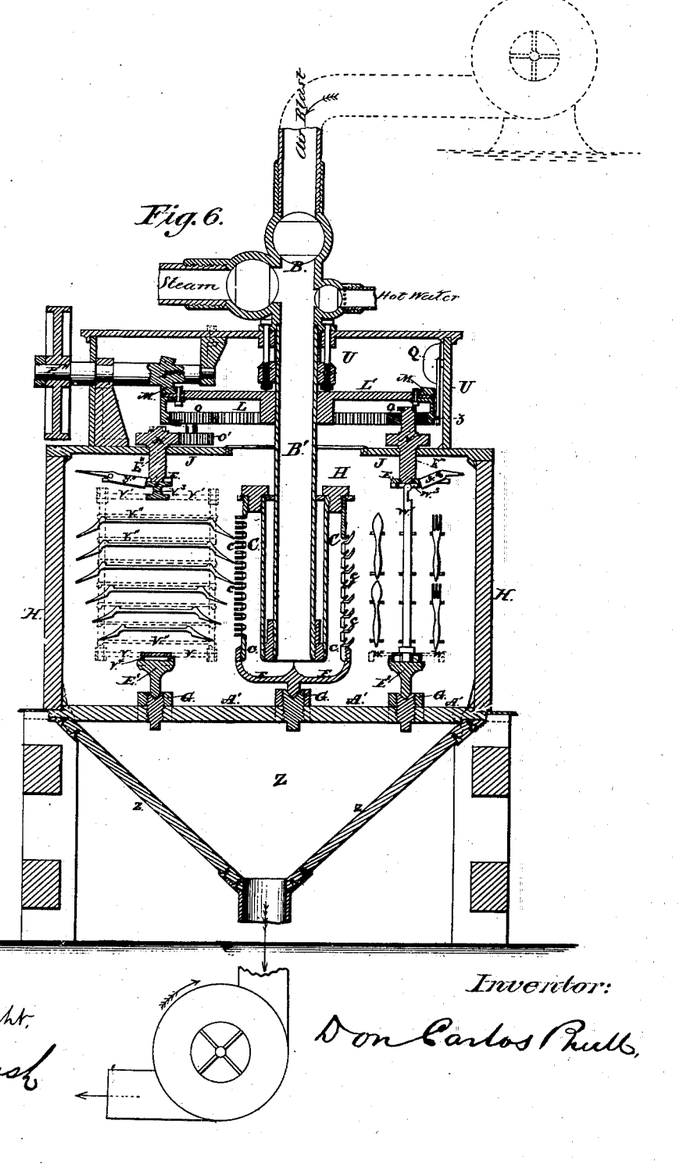

The casing of the machine is divided into three compartments, U H Z, Figs. 1 and 6, arranged one above the other. The first or upper compartment, U, contains the gearing by which motion is transmitted from the motor to a revolving system of jet-pipes, and to the rotating frames designated as "receivers" and "holders," in which the dishes, &c., are supported and confined during the cleansing operation. The term "receiver" is applied to the pivoted frames to which rotary motion is directly imparted, while the term "holder" designates the frames on which the dishes are placed, and which are detachable from the receivers. The second or middle compartment, H, contains the said receivers and jet-pipes. The holders are unconnected with it except in the process of cleansing. This compartment is the cleansing-chamber proper, and is provided with hinged doors on all sides for convenient insertion and removal of the dishes, &c. The third compartment, Z, is practically the lower portion or bottom of the cleansing-chamber H, the only separation between them consisting of an open frame-work or cross-bars of iron to afford points of support for the receivers and revolving pipes contained in the cleansing-chamber. It is conical in form, and has a pipe attached, through which the water, steam, and other accumulation of the cleansing process are discharged. Said pipe likewise serves as the medium for effecting any necessary rarefaction of the atmosphere in the cleansing-chamber H, by connecting it in a suitable manner with an exhaust-fan or blower. The steam, hot-water, and air-blast pipes are respectively provided with stop-cocks and joined to one common vertical pipe, the upper or exterior portion of which, B, Fig. 6, is bolted to the top plate of the machine—that is to say, of the compartment U.

The lower or interior portion of this pipe (marked B' in the drawing) is movable, and is connected with the upper portion by a box and packing to form a tight joint, and it reaches to near the bottom of the middle compartment or cleansing-chamber H, terminating in, or joined to, an enlarged part or chamber, F, from which proceed upward branch pipes C, six in number, more or less, standing parallel to and around the main pipe B', about equidistant apart and suitably secured to it. These branch pipes C are closed at their upper end, and have projecting from them outwardly in planes passing through the axis of the main pipe B' a number of short jet-pipes, c. The several pipes—main, branch, and jet—are so proportioned and shaped that the steam or spray, having a suitable pressure in the main pipe, shall flow with a certain accelerated motion through the branch pipes, and be discharged from the jet-pipes with great velocity upon the surfaces to be cleansed. The jets from any one branch pipe all project at the same vertical angle; but those of different branch pipes have different vertical angles. The intervals between the jet-pipes, measured vertically, depend somewhat upon the angle which is to be given to the jets, being greater for every departure from ninety degrees. The mouth of the hot-water-supply pipe may be covered by coarse wire-gauze, to facilitate, in connection with the steam from the steam-supply pipe, the conversion of the hot water into spray, or to saturate the steam.

Figure 3:
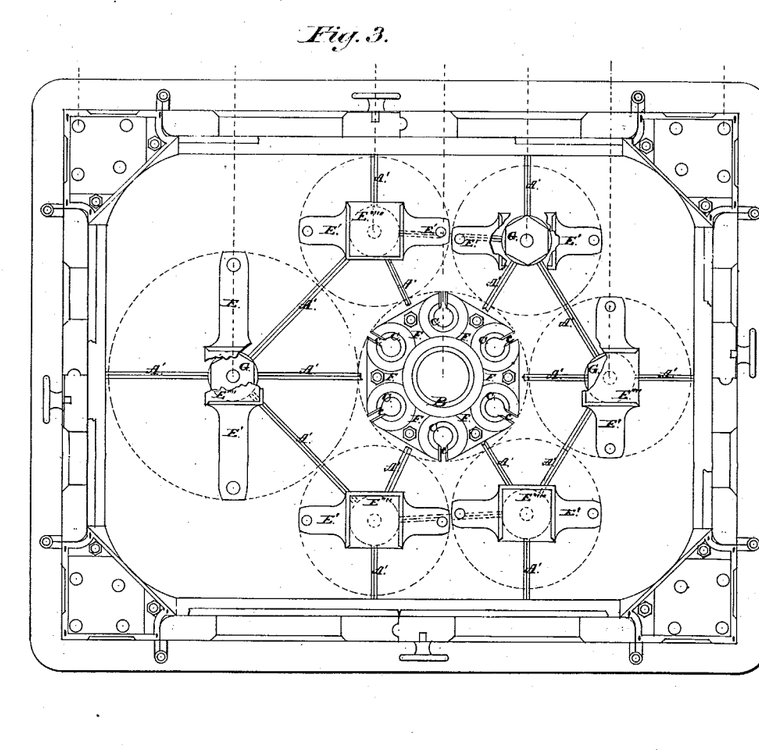
Figure 4:
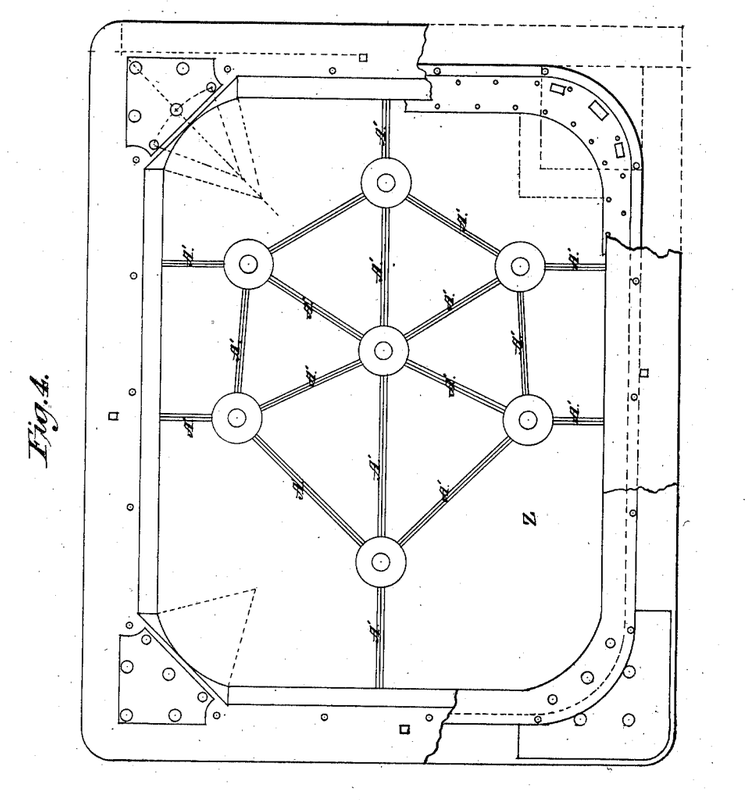
Figure 5:
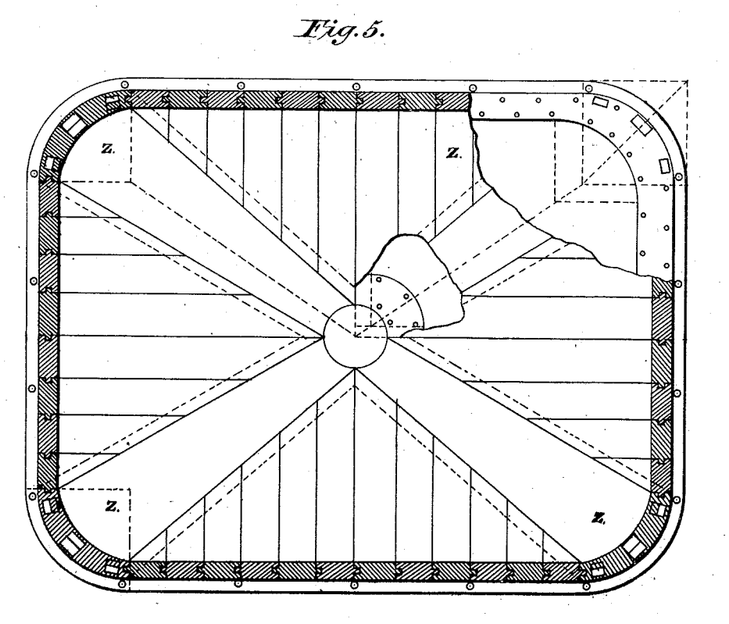

The main pipe B', with its branch and jet pipes C and c, revolves around its axis upon a pivot stepped in an adjustable step-block or set-screw, G. Arranged around the revoluable column of jet-pipes are upright rectangular iron frames, Fig. 7, designated as "receivers," formed by a top plate or bar, E, and a bottom plate or bar, E', and two side rods, E''. The bottom plates E' of receivers have at their center pivots, which work in conical sockets G, or seats formed in the cross-bars or frames A' of the first plate of the machine, Figs. 4 and 6, and the top plates E of said receivers are connected with the journals of the gears or pinions H, which project down through the floor J of compartment U, Figs. 6 and 11. The gears or pinions N mesh with gears O', which are fast on the same shaft with gears O. The latter mesh with the large internally-toothed gear L, forming part of, or rigidly connected to, the annular gear M, which is toothed on its upper side and supported by curved arms L' upon the main pipe B', which serves as a shaft to revolve the same. The driving-shaft P''' imparts motion to the latter through the medium of a gear, P''''. The annular gears are keyed and supported upon the pipe B', Fig. 6, and thus the latter and the system of jet-pipes are caused to rotate once for each revolution of the gears, while the receivers and holders for the dishes are rotated seven times in the same interval; but the relative motion of the receivers and jet-pipes may be varied in construction by a suitable change in the size of the connecting-wheels. In practice, the external connections should be such as to give one revolution of the jet-pipes C in from one to three minutes. In that case, also, one revolution of the jets will ordinarily be sufficient for one cleansing, and one more revolution for drying and cooling. The completion of a revolution of the jet-pipes is signaled by the stroke of a bell, Q, Fig. 6, attached to the machine, and sounded automatically by means of a tooth, z, on the main cog-wheel. The holders, with their fixtures, in which the articles to be cleansed are immediately placed, are made detachable from the machine, and are of different sizes and models for the different classes of articles. Each bottom plate or bar E of the receivers is provided with a rectangular socket, E'''', Figs. 3 and 7, to receive the corresponding-shaped head V⁴, formed on the bottom plate V of the holder, and a grooved socket, y, is formed in the top bar E of the receiver, to admit a T-shaped head, V³, formed on the top plate V¹ of the holder, Fig. 15. The latter is held locked in the receiver or frame E E' E'', Fig. 7, by a pivoted gravity-catch, y'', Figs. 6 and 7. The plates, cups, or other dishes to be washed, are supported in the holders by various forms of frames, most of which are cruciform in shape. These frames, when the holders are empty, are supported at their four extremities, which are slotted, so as to straddle the upright rods r' by small pins or rests, in such a manner that they may slide up and down in the space from one set of pins to the set above.

Figures 7, 10, 11, 12, 13, 14:
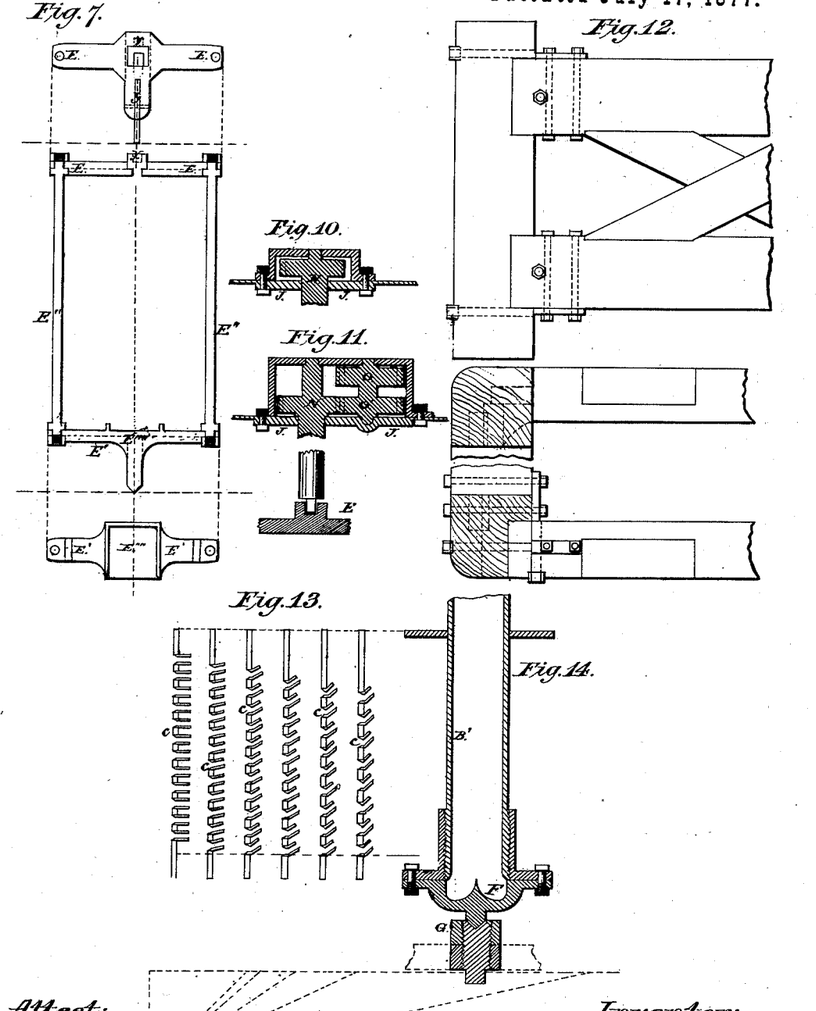
Figure 8:
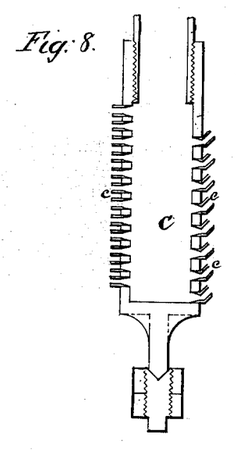
Figure 9:
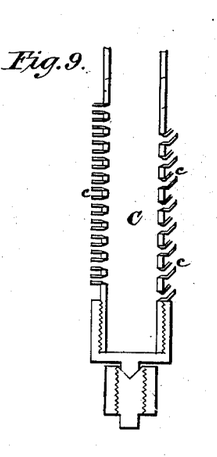

The slots or notches V⁵, formed in the side arms of these frames, are made oblique or diagonal, so that their diagonally-opposite edges will bite or hold by friction against the side rods, when the frame is in position, and thus prevent it from tilting forward when the front rod is removed and the dishes are being introduced; and in order, also, that the edges shall open from the side rods, and allow a free motion when the front of the frame is being raised. For the lighter articles of dishes the space between the frames is so regulated that the frames shall rest upon the articles and hold them steadily in place. These frames are, in some cases, made with straight arms, which are best for very shallow articles, and, in some cases, with a curved vertical outline, which will fit into the mouth or over the bottom of deeper articles, such as bowls, by which means the articles may be made to occupy less space, and also to keep a fixed central position when placed in a larger holder than necessary.

Figure 20:
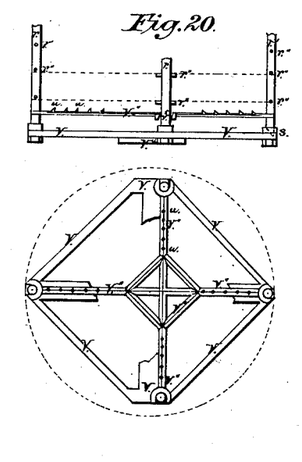

For large heavy articles, such as meat-dishes, &c., and for most large non-circular and irregular-shaped articles, the front arm of the frame should be shorter than the rear arm, and the side rods of the holder be placed correspondingly in front of the center, Fig. 20, in order to prevent the frames from tilting to the front when the front rod is removed to admit the articles. In this case, also, the upper side of the arms of the frames has small projections u at certain intervals, by which to keep the articles in a fixed central position. The removable rod r' slides easily through an aperture, $s'$, in the top plate, and catches in a notch, $s$, in the bottom plate of the holder, Fig. 15.

Figures 15, 16, 17, 18, 19, 21:
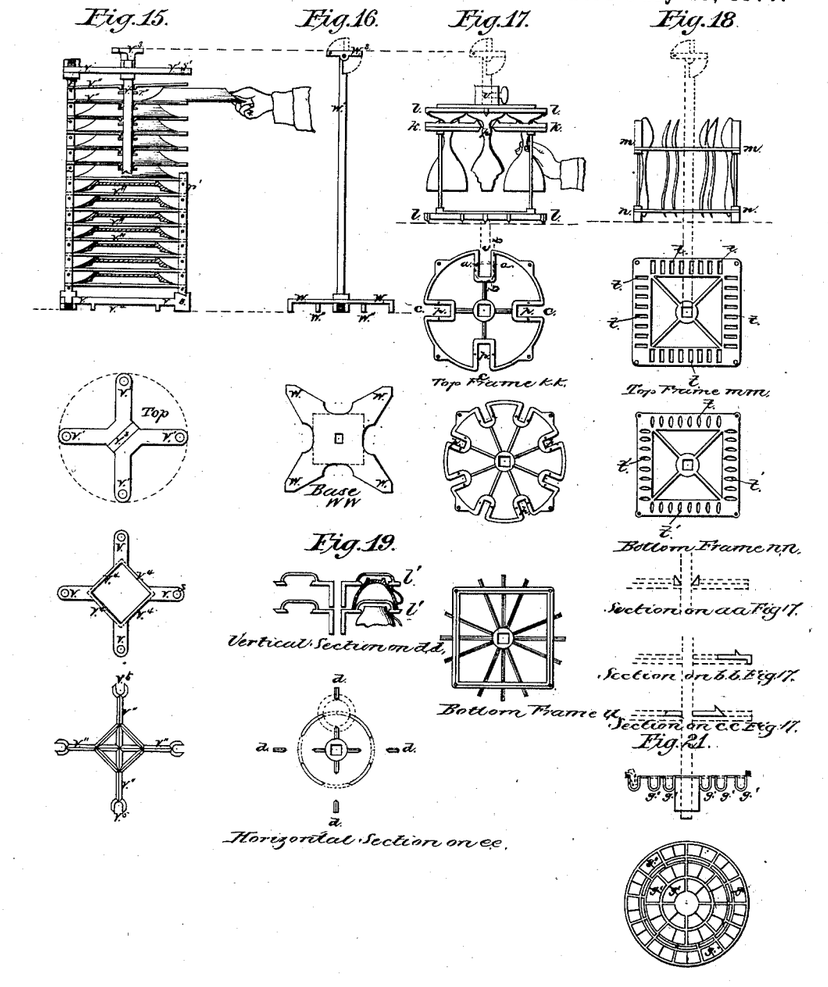

For the smaller wares the top plate and four side rods of the holder above described are replaced in the construction by a single square rod, $w'$, fixed perpendicularly in the center of the bottom plate $w$, Fig. 16, and the articles to be cleansed are placed in detached frames or stands, which fit upon the square rod by a corresponding hole in the center.

Goblets, wine-glasses, and other light articles of similar shape, are suspended by their stems, bottom upward, in open slots $p$, around the circumference of their appropriate stand, Fig. 17, and are held in place by the bottom frame $l$ of a stand above, or by a detached frame of similar shape. If necessary, this frame may be held firmly in place by means of a thumb-screw working in it, or in a separate clamp, $v$, fitting over it.

Cups, bowls, and similar articles rest, bottom upward, on slight open frames, with a similar frame resting on them above, Fig. 19, the vertical outlines $l'\ l'$ of these frames being such as to give the article a fixed position by fitting into the mouth or over the bottom of it.

This shape of stand may also be used for lamp-chimneys, goblets, wine-glasses, and all small cup-shaped articles.

Spoons, forks, and similar articles are held in a vertical position in separate apertures around the sides of their appropriate stand, Fig. 18, the apertures $t\ t'$ being so shaped that the articles will, by their own weight, wedge into them, and thus be prevented from turning when under the action of the jets.

The stand for small articles, like salt-cellars, consists of a slight frame of wire or casting, having a series of open spaces around its center, of about the size of the articles when inserted edgewise, with a hanging-loop, $j$, across the space, by which the article is suspended, Fig. 21.

All parts of the holders and their fixtures are so constructed as to present the least possible obstruction to the free passage of the currents of steam, hot water, and spray, the movable frames and detached stands, especially, always with oblique surfaces toward the articles and toward the main pipe, so as to deflect rather than obstruct the currents, and so, also, that the necessary contact of the parts with the articles to be cleansed shall be formed at a few points, and not along lines or surfaces. All the holders have handles at the top, by means of which they may be carried conveniently, and which also fit to the groove and latch in the top plate of the receivers. The handle of the holder for detached stands is hinged so as to fold down along the upright rod, and allow the stands to pass over it. By means of a hole in the handle, the holders are suspended in an appropriate place when not in use.

The machine and its various parts, fixtures, and appliances may be made of any suitable material, and may be plated, coated, or washed with any metal or other substance that will afford protection against corrosion or decay.

This specification supposes more particularly a machine with a capacity of six receivers—one of twenty, one of thirteen, and four of twelve inches diameter—and of a height for twelve dinner-plates, or their equivalents in space, to each—that is, seventy-two plates or their equivalents; but the capacity may be varied in the construction by increasing or diminishing the number of receivers, or by varying their diameters or height, all of which variations will cause a corresponding change in the general dimensions, and in various details of construction.

The undersigned claims the right of invention and discovery in the following particulars, as set forth in this specification and the accompanying drawings and explanations, to wit:

1. The combination of a suitable air-impelling device, a pipe, B, and tubes connected therewith, for directing the cold-air blast upon the cleansed dishes or ware, for the purpose of drying and cooling the same, substantially in the manner set forth.

2. In combination with the cleansing-chamber and the tube connected with the bottom thereof, a suction or exhaust pan, for the purpose of rapidly exhausting the vapor from the chamber, substantially in the manner specified.

3. In a machine for cleansing various articles of table or culinary ware, the combination, with a series of vertical steam and water discharge or jet pipes, of a series of racks or holders for said ware, the same being arranged around the system of jet-tubes, and pivoted so as to revolve horizontally, in the manner described, whereby the whole circumference of each article to be cleansed is exposed to the action of the steam and water jets, as set forth.

4. A system of revolving pipes, B C D, substantially as described, for throwing the steam, hot water, and spray in jets of different angles upon the articles to be cleansed.

5. Revolving receivers, substantially as described, constructed with a seat, $E''''$, in the bottom plate, and a groove and catch, $y''$, in the top plate, to secure in a uniform position the holders in which the articles to be cleansed are immediately placed.

6. A wheel, L, firmly attached to the main pipe B and connecting with the wheels N, to effect a relative and simultaneous motion of the receivers and jet-pipes, substantially as set forth.

7. The combination of the annular gear M and suitable connecting mechanism with the series of concentrically-placed revolvable receivers, as shown and described.

8. A conical or other shaped funnel, Z, under the cleansing-chamber, with its rim bolted to the plate A, substantially as set forth, to receive and carry off the steam, water, and other accumulations of the cleansing.

9. The arrangement of a bottom plate, A, open in the cleansing-chamber, with cross-bars A' and set-screws G, substantially as set forth, to afford points of support for the receivers and system of revolving pipes, and at the same time allow the accumulations of the cleansing to fall without obstruction into the funnel.

10. The table or supporting-frame, of iron or strong timber, to sustain the machine, with a movable end frame fastened and unfastened by means of bolts to admit the funnel, substantially as set forth.

11. The rotating wheel L, having an arm or tooth, in combination with the stationary bell for giving the signal of the progress of cleansing process, as set forth.

D. C. BUELL.

Witnesses:
J. M. WRIGHT,
T. J. BUSH.